July 14, 1970               H. RYEN             3,520,314
AUTOMATIC SHUT-OFF MEANS FOR THE SUPPLY TO A TANK WHOSE
FLOAT VALVE CONTROL HAS BECOME DEFECTIVE, ALLOWING
AN OVERFLOW
Filed Jan. 18, 1968
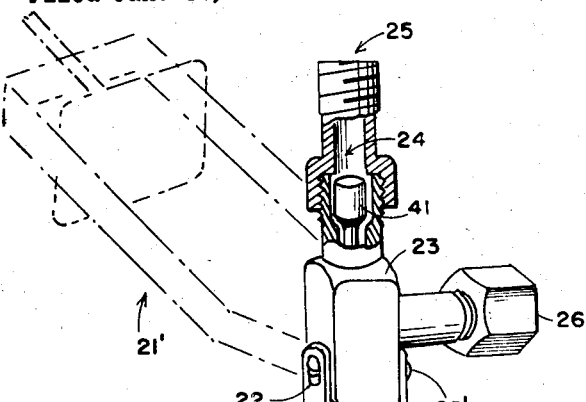
FIG.1
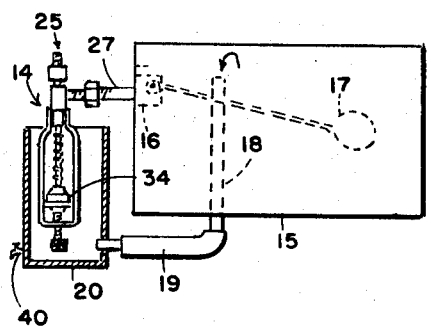
FIG.2
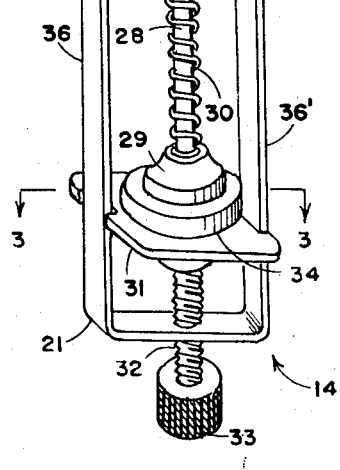
FIG.3
*INVENTOR,*
Hirsh Ryen,
ATTORNEY.

United States Patent Office 3,520,314
Patented July 14, 1970

3,520,314
AUTOMATIC SHUT-OFF MEANS FOR THE SUPPLY TO A TANK WHOSE FLOAT VALVE CONTROL HAS BECOME DEFECTIVE, ALLOWING AN OVERFLOW
Hirsh Ryen, 79—11 260th St.,
Floral Park, N.Y. 11004
Filed Jan. 18, 1968, Ser. No. 698,834
Int. Cl. F16k *31/00*
U.S. Cl. 137—67                           2 Claims

ABSTRACT OF THE DISCLOSURE

An auxiliary valve, held in open condition by a soluble tablet positioned in an empty auxiliary tank, is interposed in the supply pipe to a main tank whose filling is controlled by a float valve. The main tank has an overflow tube which discharges into the auxiliary tank. Should there be an overflow, the tablet will dissolve and the auxiliary valve will assume closed condition.

---

The present invention relates to, and its principal object is to provide a novel and improved means to automatically cut-off the supply to a tank whose float-controlled valve has become defective, and there is no provision to dispose of an overflow, so without my new device, an area would become flooded as is incident in many oil burner feed systems, water tanks and the like.

Another object thereof is to provide a novel and improved automatic cut-off system of the character described, which is simple in structure, reasonable in cost to manufacture, easy to manipulate and efficient in carrying out the purposes for which it is designed.

Other objects and advantages will become apparent as this disclosure proceeds.

For one practice of this invention, the tank is provided with an overflow tube which discharges into an auxiliary tank into which extends the valve stem of a normally closed auxiliary valve interposed in the main tank's feed pipe, and a supported tablet which is readily soluble in the liquid fed to the main tank, maintains the auxiliary valve in open condition. In the event of an overflow, said tablet is dissolved and the auxiliary valve assumes closed condition. The tablet's support member is swingable to facilitate cleaning and reloading.

In the accompanying drawing forming part of this specification, similar characters of reference indicate corresponding parts in all the views.

FIG. 1 is a diagrammatic representation of a system employing this invention, ready to operate upon an overflow.

FIG. 2 is a perspective view of a preferred embodiment of the tablet-controlled auxiliary valve included in the system shown in FIG. 1. The valve here shown, is of the poppet type, and is shown enlarged.

FIG. 3 is a section taken at line 3—3 in FIG. 2.

In the drawing, the numeral 14 designates generally a valve device which is interposed in the supply line to a main tank 15 which is equipped with a valve 16 controlled by a float 17, which shuts the valve 16, when the liquid in said tank reaches a certain level. Should this valve 16 become defective, the level in the tank 15 will rise above normal, and the overflow will pass down the overflow tube 18, which extends upward through the floor of said tank, and its lower end is connected to discharge into an auxiliary tank 20, through the pipe 19. A U-shaped piece of band stock, is preferably arranged as a bail 21, for its distal ends are pivotally mounted on the aligned pintles 22, 22', which may be screws threadedly engaged on opposite faces of the body 23 of an auxiliary valve 24, whose intake port is at 25, and its discharge port 26 is connected by a pipe 27 to the intake port of the tank's main float-controlled valve 16. The valve stem 28 of said auxiliary valve, extends downwardly between and along the arms of the bail 21, and its lower distal end carries a button head 29. A stressed compression spring 30 about the valve stem 28, bears against said button head 29, and against the valve body 23, to bias the auxiliary valve 24, to closed condition. A platform 31, is slidably carried on the arms of the bail 21, for movement vertically therealong, and its position is determined by the screw 32 through a threaded hole in the bight of said bail. There is a head on the inner screw end opposite the platform, and a manipulating knob 33 at its other end. The numeral 34 designates a tablet which is readily soluble by the liquid supplied the main tank through the intake port 25. The platform may have notches 35, 35' in which the bail's arms 36, 36' ride respectively, so the bail serves as a track for said platform 31. When said tablet is placed on said platform and the latter raised by turning the screw 32 sufficiently, the auxiliary valve 24 will be in open condition as shown in FIG. 2, and liquid will flow freely from the intake port 25 and discharge into the main tank 15, to be controlled by the float valve 16. Should this float valve 16 become defective, causing an overflow into the tube 18, whose upper end is at the maximum level fluid is permitted in the main tank 15, the discharge will flow into the auxiliary tank 20, into which the bail 21 protrudes so said tablet 34 is low therein. It is evident that soon the tablet will dissolve, causing the spring 30 to forcibly shift the valve stem 28 downward, whereupon the auxiliary valve 24 will be closed, and the flow into the main tank will automatically cease.

The pipe 19 may be a detachable hose, and the auxiliary tank 20 may be removable so it may be emptied, and a new tablet, which may be an "Alka-Seltzer," can be mounted after the valve 16 is either repaired or replaced. If the auxiliary tank is mounted firm, it may be provided with a pet-cock 40, so it can be drained, and the mounting of the new tablet can be facilitated by swinging the bail 21 to any accessible position as 21', which when done, is then swung down to its normal position in the tank 20, as shown in FIG. 1.

Said valve 24 is of the poppet type, in which the rubber element 41 may be secured to the stem 28 which may be deemed the valve's operating member. If desired, the element 41 may be separate, or it may be a separate glass or rubber ball. The bail 21 is made swingable to facilitate cleaning, and if made of non-conductive material, an alarm circuit may be actuated to ring an electric bell should the tablet 34 dissolve, by using the platform 31 and the valve body 23 as the terminals of a switch to control such circuit which is not shown, but believed readily understood without the necessity of further illustration.

I claim:
1. An automatic shut-off means of the character described, comprising in combination, an auxiliary tank, an auxiliary valve having an operating member extending into said tank, means biasing said operating member to a first position where at said valve is in closed condition; said valve being adapted to be interposed in the liquid supply pipe to a main tank whose intake from said pipe is controlled by a float valve responsive to the liquid level in said main tank, which main tank has an overflow tube, means adapted to communicatively connect said auxiliary tank with said overflow tube whereby any liquid entering said overflow tube, will discharge into said auxiliary tank, an element extending from the body of the auxiliary valve, a support carried by said element opposite said operating member; said support being movable along said element towards and away from said operating mem- ber, means to adjust the position of said support along said element, and a tablet which is soluble in said liquid, positioned against said support and contacted by said operating member; said operating member having been shifted to a second position against the bias of said biasing means whereat said auxiliary valve is in open condition, by said placement of said tablet to contact both said support and operating member, whereupon should liquid be discharged into the auxiliary tank to cause said tablet to disintegrate, the auxiliary valve thereupon assumes the closed condition.

2. An automatic shut-off means as defined in claim 1, wherein said element is swingably mounted on the body of the auxiliary valve.

References Cited

UNITED STATES PATENTS

| | | | |
|---|---|---|---|
| 1,770,913 | 7/1930 | DeKermor | 137—400 |
| 1,788,827 | 1/1931 | Ferrin | 137—400 |
| 1,993,666 | 3/1935 | Hornell | 137—67 |
| 2,798,503 | 7/1957 | Carver et al. | 137—67 |

WILLIAM F. O'DEA, Primary Examiner

RICHARD GERARD, Assistant Examiner

U.S. Cl. X.R.

137—400